(12) United States Patent
Kuehnle et al.

(10) Patent No.: US 7,598,307 B2
(45) Date of Patent: Oct. 6, 2009

(54) TRANSPARENT MASTERBATCHES FOR THERMOPLASTICS

(75) Inventors: Adolf Kuehnle, Marl (DE); Carsten Jost, Marl (DE)

(73) Assignee: Degussa AG, Duesseldorf (DE)

( * ) Notice: Subject to any disclaimer, the term of this patent is extended or adjusted under 35 U.S.C. 154(b) by 78 days.

(21) Appl. No.: 10/556,719

(22) PCT Filed: Mar. 18, 2004

(86) PCT No.: PCT/EP2004/050327

§ 371 (c)(1),
(2), (4) Date: Nov. 14, 2006

(87) PCT Pub. No.: WO2004/101653

PCT Pub. Date: Nov. 25, 2004

(65) Prior Publication Data

US 2007/0072972 A1    Mar. 29, 2007

(30) Foreign Application Priority Data

May 14, 2003 (DE) ................................ 103 21 555

(51) Int. Cl.
*B60C 1/00* (2006.01)
*C08K 5/24* (2006.01)
*C08K 5/54* (2006.01)
*A61Q 19/00* (2006.01)

(52) U.S. Cl. ...................................... 524/261; 524/267

(58) Field of Classification Search ................. 524/261, 524/267
See application file for complete search history.

(56) References Cited

U.S. PATENT DOCUMENTS

| 5,241,014 | A | 8/1993 | Kehr et al. | |
|---|---|---|---|---|
| 5,412,029 | A | 5/1995 | Elm et al. | |
| 2001/0006988 | A1 | 7/2001 | Kuhnle et al. | |
| 2001/0018486 | A1 | 8/2001 | Lichtenhan et al. | |
| 2002/0128414 | A1* | 9/2002 | James et al. | 526/279 |
| 2002/0137625 | A1 | 9/2002 | Jost et al. | |
| 2002/0193533 | A1* | 12/2002 | Kamo et al. | 525/397 |
| 2003/0018109 | A1 | 1/2003 | Hsiao et al. | |
| 2003/0050408 | A1 | 3/2003 | Puhala et al. | |
| 2003/0096934 | A1 | 5/2003 | Jost et al. | |
| 2005/0010011 | A1 | 1/2005 | Spyrou et al. | |
| 2005/0010012 | A1 | 1/2005 | Jost et al. | |

FOREIGN PATENT DOCUMENTS

WO      03/042292      5/2003

OTHER PUBLICATIONS

Lichtenhan et al. "Thermoplastic Hybrid Materials: Polyhedral Oligomeric Silsesquioxane (Poss) Reagents, Linear Polymers, and Blends", Mat. Res. Soc. Symp. Proc., vol. 435, pp. 3-11 1996.
Haddad et al. "Hybrid Organic-Inorganic Thermoplastics: Styryl-Based Polyhedral Oligomeric Silsesquioxane Polymers", Macromolecules, vol. 29, pp. 7302-7304 1996.
U.S. Appl. No. 10/511,593, filed Nov. 2, 2004, Kuehnle, et al.
U.S. Appl. No. 10/005,108, filed Dec. 7, 2001, Jost, et al.
U.S. Appl. No. 07/743,894, filed Aug. 12, 1991, Elm, et al.

* cited by examiner

*Primary Examiner*—Mark Eashoo
*Assistant Examiner*—Angela C Scott
(74) *Attorney, Agent, or Firm*—Oblon, Spivak, McClelland, Maier & Neustadt, L.L.P.

(57) ABSTRACT

The invention relates to a transparent masterbatch for improving the surface properties of thermoplastics, said masterbatch containing from 10% to 60% by weight of polyhedral oligomeric silicon-oxygen cluster units in accordance with the formula $[(R_aX_bSiO_{1.5})_m(R_cX_dSIO)_n(R_eX_fSi_2O_{2.5})_o(R_gX_hSi_2O_2)_p]$ where: a, b, c=0-1; d=1-2; e, f, g=0-3; h=1-4; m+n+o+p≧4; a+b=1; c+d=2; e+f=3 and g+h=4; R=hydrogen atom, alkyl, cycloalkyl, alkenyl, cycloalkenyl, alkynyl, cycloalkynyl group or polymer unit, each substituted or unsubstituted, or further functionalized polyhedral oligomeric silicon-oxygen cluster units attached via a polymer unit or a bridging unit, X=oxy, hydroxy, alkoxy, carboxy, silyl, alkylsilyl, alkoxysilyl, siloxy, alkylsiloxy, alkoxysiloxy, silylalkyl, alkoxysilylalkyl, alkylsilylalkyl, halogen, epoxy, ester, fluoroalkyl, isocyanate, blocked isocyanate, acrylate, methacrylate, nitrile, amino, phosphine or polyether group or substituents of type R containing at least one such group of type X the substituents of type R being identical or different and the substituents of type X being identical or different and from 40% to 9011/o by weight of a thermoplastic carrier material, and to a transparent thermoplastic and to its production process.

16 Claims, No Drawings

TRANSPARENT MASTERBATCHES FOR THERMOPLASTICS

The present invention relates to a transparent masterbatch for improving the surface properties of thermoplastics, and the transparent thermoplastic, and to a process for preparing it.

The term masterbatch refers to concentrates, ie., additives finely dispersed in high concentration in a carrier material. Such concentrates are used, by metered addition of the masterbatch during the processing of the pellets to a semifinished product or finished molding, to equip the polymer or plastic in accordance with its application. By this means it is possible, for example, to make specific adjustments to the mechanical properties, color, thermal stability, stability to oxidation, etc. Customary additives include heat stabilizers and light stabilizers, optical brighteners, antistats, lubricants, antiblocking agents, nucleating agents, fillers, dyes, pigments, and flame retardants.

A basic principle when using masterbatches is that during the processing of the pellets, in the case of plastics the extrusion operation, for example, the time in the melt is used in order to distribute the additive, via the masterbatch, rapidly and homogeneously in the pellets. This leads not only to precise metering of the additive but also to simple and reliable handling such as absence of dust for example.

Masterbatches can generally be prepared using, for example, high-speed mixers, Banbury kneaders or extruders and, depending on preparation method and application, have the following composition:
10 -90% by weight additive
10 -90% by weight carrier material or polymer of the kind at which the application is aimed
0 -10% by weight adjuvants.

Since customary masterbatches in plastic generally comprise largely insoluble components and since the particle size of the additives used is well within the visible range of light, i.e., above about 400 nm, the light transmittance of the masterbatch and of the end product is adversely affected.

It was the object of the present invention to provide a masterbatch for thermoplastics that enhances the properties of the plastic produced from it as compared with the state of the art.

Surprisingly it has been found that a masterbatch which comprises a thermoplastic carrier material and from 10% to 60% by weight of polyhedral oligomeric silicon-oxygen clusters is transparent. The achievement of the object was all the more surprising since it was found that the thermoplastics produced therefrom continue to retain their transparency through mixing with the masterbatch. A further surprise was that the sure properties, such as scratch resistance and tactility, for example, are influenced positively by the masterbatch of the invention.

By a polyhedral oligomeric silicon-oxygen cluster is meant, preferably, the two classes of compound represented by the silasesquioxanes and the spherosilicates.

Silasequioxanes are oligomeric or polymeric substances whose fully condensed representatives possess the general formula $(SiO_{3/2}R)_n$, where $n \geq 4$ and the radical R can be a hydrogen atom but is usually an organic radical. The smallest structure of a silasequioxane is the tetrahedron. Voronkov and Lavrent'yev (Top. Curr. Chem. 102 (1982), 199-236) describe the synthesis of fully condensed and incompletely condensed oligomeric silasequioxanes by hydrolytic condensation of trifunctional $RSiY_3$ precursors, in which R is a hydrocarbon radical and Y is a hydrolyzable group, such as chloride, alkoxide or siloxide, for example, Lichtenhan et al. describe the base-catalyzed preparation of oligomeric silasesquioxanes (WO 01/10871). Silasesquioxanes of the formula $R_8Si_8O_{12}$ (with identical or different hydrocarbon radicals R) can be reacted with base catalysis to form functionalized, incompletely condensed silasesquixonanes, such as $R_7Si_7O_9(OH)_3$ or else $R_8Si_8O_{11}(OH)_2$ and $R_8Si_8O_{10}(OH)_4$, (Chem. Commun. (1999), 2309-10; Polym. Mater. Sci. Eng. 82 (2000), 301-2; WO 01/10871) and hence serve as parent compound for a multiplicity of different, incompletely condensed and functionalized silasesquioxanes. The silasesquioxanes (trisilanols) of the formula $R_7Si_7O_9(OH)_3$ in particular can be converted, by reaction with functionalized monomeric silanes (corner capping), into correspondingly modified oligomeric silasesquioxanes.

Oligomeric spherosilicates have a construction similar to that of the oligomeric silasesquioxanes. They too possess a "cagelike" structure. Unlike the silasesquioxanes, owing to their preparation method, the silicon atoms at the corners of a spherosilicate are connected to a further oxygen atom, which in turn is substituted further. Oligomeric spherosilicates can be prepared by silylating suitable silicate precursors (D. Hoebbel, W. Wieker, Z. Anorg. Allg. Chem. 384 (1971), 43-52; P. A. Agaskar, Colloids Surf. 63 (1992), 131-8; P. G. Harrison, R. Kannengiesser, C. J. Hall, J. Main Group Met. Chem. 20 (1997), 137-141; R. Weidner, Zeller, B. Deubzer, V. Frey, Ger. Offen. (1990), DE 38 37 397). For example, the spherosilicate with the structure 2 can be synthesized from the silicate precursor of the structure 1; which in turn is obtainable from the reaction of $Si(OEt)_4$ with choline silicate or by the reaction of waste products from the harvesting of rice with tetramethylammonium hydroxide (R. M. Laine, I. Hasegawa, C. Brick, J. Kampf, Abstracts of Papers 222nd ACS National Meeting, Chicago, Ill., United States, Aug. 26-30, 2001; MTLS-018).

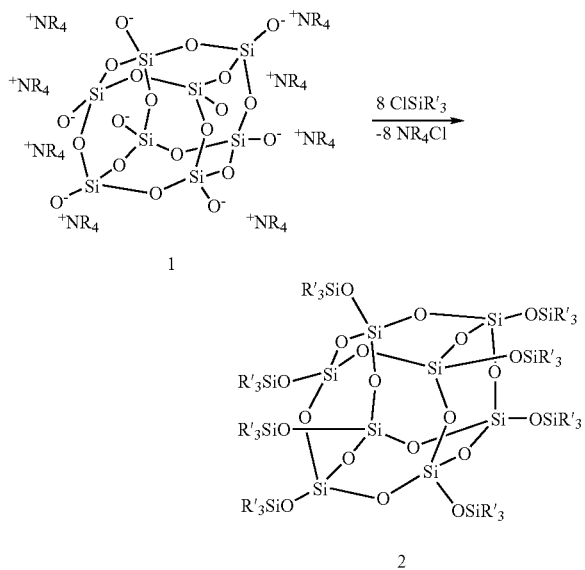

The silasequioxanes and the spherosilicates are both thermally stable at temperatures up to several hundred degrees Celsius.

The present invention provides a transparent masterbatch for improving the surface properties of thermoplastics, said masterbatch containing from 10% to 60% by weight of polyhedral oligomeric silicon-oxygen cluster units in accordance with the formula

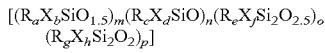

where:
a, b, c=0-1; d=1-2; e, f, g=0-3; h=1-4; m+n+o+p≧4; a+b=1; c+d=2; e+f=3 and g+h=4;

R=hydrogen atom, alkyl cycloalkyl, alkenyl, cycloalkenyl, alkyl, cycloalkynyl group or polymer unit, each substituted or unsubstituted, or further functionalized polyhedral oligomeric silicon-oxygen cluster units attached via a polymer unit or a bridging unit, X=oxy, hydroxy, alkoxy, carboxy, silyl, alkylsilyl, alkoxysilyl, siloxy, alkylsiloxy, alkoxysiloxy, silylallyl, alkoxysilylalkyl, allylsilylallyl, halogen, epoxy, ester, fluoroalkyl, isocyanate, blocked isocyanate, acrylate, methacrylate, nitrile, amino, phosphine or polyether group or substituents of type R containing at least one such group of type X, the substituents of type R being identical or different and the substituents of type X being identical or different and from 40% to 90% by weight of a thermoplastic carrier material.

The present invention also provides a process for preparing a transparent thermoplastic, which comprises mixing one part by weight of the masterbatch of the invention into from 3 to 11 parts by weight of a thermoplastic polymer mechanically without solvent at a temperature of at least 500° C.

The invention further provides a transparent thermoplastic prepared by the process of the invention, wherein the concentration of the polyhedral oligomeric silicon-oxygen cluster units in the polymer composition is not more than 5% by weight.

The masterbatch of the invention has the advantage over the prior art that the polyhedral oligomeric silicon-oxygen cluster units are present in extremely finely divided form in the thermoplastic carrier material; in other words, the particle size of the polyhedral oligomeric silicon-oxygen clusters is well below the wavelength of visible light. The fillers added in accordance with the prior art to increase the hardness and scratch resistance, by contrast, are inorganic in nature and have a particle size which is above the wavelength of visible light. The masterbatch of the invention is therefore highly suitable for the preparation of transparent thermoplastics. The plastics prepared by means of the masterbatch of the invention, furthermore, display a transparency, provided that the plastic was already transparent before the masterbatch was added. As well as the positive aspect in relation to the transparency, it is also possible for the addition of the masterbatch of the invention to raise the scratch resistance as compared with the plain thermoplastic. A further advantage of the masterbatch of the invention is the increase in the glass transition temperature of the thermoplastic. Another advantageous feature of the masterbatch of the invention is that the tactity of the thermoplastics prepared from it is enhanced. Moreover, the masterbatch of the invention features good processing properties. Use of the masterbatch of the invention results not only in an increase in the scratch resistance of the plastic, with retention of the light transmittance, but also in an increase in the thermal stability and in an increase in the electrical resistance. In contradistinction to many conventional additives, it is possible, by way of the substituents of the polyhedral oligomeric silicon-oxygen cluster units, to control the behavior of the masterbatch of the invention and hence also to influence the properties of the plastic which results from it. The physical and chemical properties can therefore be tailored. The polarity can be set by way of the substituents of type R and X on the polyhedral oligomeric silicon-oxygen cluster units. By way of the different structure and polarity of these substituents it is possible to control whether the polyhedral oligomeric silicon-oxygen cluser units will have a more organic or more inorganic character. Depending on structure, the polyhedral masterbatches of the invention can have great thermal stability.

The transparent masterbatch of the invention for improving the surface properties of thermoplastics inventively contains from 10% to 60% by weight of polyhedral oligomeric silicon-oxygen cluster units in accordance with the formula

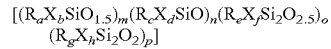

where:
a, b, c=0-1; d=1-2; e, f, g=0-3; h=1-4; m+n+o+p≧4; a+b=1; c+d=2; e+f=3 and g+h =4;

R=hydrogen atom, alkyl, cycloalkyl, alkenyl, cycloalkenyl, alkynyl, cycloalkwyl group or polymer unit, each substituted or unsubstituted, or further functionalized polyhedral oligomeric silicon-oxygen cluster units attached via a polymer unit or a bridging unit, X=oxy, hydroxy, alkoxy, carboxy, silyl, alkylsilyl alkoxysilyl, siloxy, alkylsiloxy, alkoxysiloxy, silylalkyl, alkoxysilylalkyl, allylsilylalkyl, halogen, epoxy, ester, fluoroalkyl, isocyanate, blocked isocyanate, acrylate, methacrylate, nitrile, amino, phosphine or polyether group or substituents of type R containing at least one such group of type X, the substituents of type R being identical or different and the substituents of type X being identical or different and from 40% to 90% by weight of a thermoplastic carrier material.

The masterbatch of the invention contains preferably from 20 to 50% by weight of polyhedral oligomeric silicon-oxygen cluster units and from 50% to 80% by weight of the thermoplastic carrier material, more preferably from 20% to 40% by weight of polyhedral oligomeric silicon-oxygen cluster units and from 60% to 80% by weight of the thermoplastic carrier material.

The thermoplastic carrier material of the masterbatch of the invention preferably comprises at least one polymer selected from polyester, copolyester, polycarbonate, polyamide, copolyamide, polyether-block-amide, cyclic olefin copolymer (COC), polymethyl methacrylate, polyphenylene ether, polyurethane, polysiloxane, polysilane, polytetmfluoroethylene, polyoxymethylene, polyvinyl chloride, vinyl chloride copolymer, polystyrene, copolymers of styrene, acrylonitdile-butadiene-styrene copolymers (ABS polymers), styrene-acrylonitrile copolymers (SAN polymers) or rubber. Preferably the thermoplastic carrier material comprises at least one polymer selected from polyester, copolyester, polymethyl mescrylate, polycarbonate, polyamides, copolyamides or polyether-block-amides.

In one particular embodiment of the masterbatch of the invention the thernoplastic carrier material comprises further additives, examples being heat stabilizers and light stabilizers, optical brighteners, antistats, lubricants, antiblocking agents, fillers, dyes or pigments—depending on the subsequent use of the plastic.

The polyhedral oligomeric silicon-oxygen clusters of the masterbatch of the invention preferably contain substituents of type X, which represent an amino, hydroxy, carboxy, isocyanate, epoxy, polyether, alkoxysilyl, siloxy, alkylsiloxy, alkoxysiloxy or alkoxysilylalkoxy group. The polyhedral oligomeric silicon-oxygen clusters preferably contain a substituent of type X selected from alkoxysilyl, siloxy, alkylsiloxy, alkoxysiloxy, alkoxysilylalkyl, amino, hydroxy, isocyanate or epoxy group. With particular preference, however, the substituent of the type X or of the type R contains a vinylic group.

On the basis of their molecular character the polyhedral oligomeric silicon-oxygen clusters of the masterbatch of the invention possess a uniform and defined molecular weight. In one particular embodiment of the masterbatch of the invention the polyhedral oligomeric silicon-oxygen cluster unit has a molecular weight of preferably at least 400 g/mol, more preferably from 400 to 2500 g/mol, and with particular preference from 600 to 1500 g/mol.

The molecular size of the polyhedral oligomeric silicon-oxygen clusters of the masterbatch of the invention can be increased by joining two or more polyhedral oligomeric silicon-oxygen cluster units, functionalized with two reactive groups X, by means of condensation by way, for example, of a spacer and/or of the functional groups of the substituent of type X. Enlargement can also be achieved by means of homopolymerization or copolymerization. The masterbatch of the invention comprises polyhedral oligomeric silicon-oxygen clusters which preferably have a molecular size of not more than 100 nm, more preferably not more than 50 nm, very preferably not more than 30 nm, and with particular preference not more than 20 nm.

It can be advantageous for the masterbatch of the invention to comprise polyhedral oligomeric silicon-oxygen cluster unit based on the structure 3

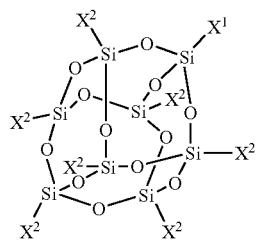

3 where $X^1$=substituent of type X or of type —O—$SiX_3$, $X^2$=substituent of type X, of type —O—$SiX_3$; of type R, of type —O—$SiX_2R$, of type —O—$SiXR_2$ or of type —O—$SiR_3$, R=hydrogen atom, alyl, cycloalkyl, alkenyl, cycloalkenyl, aflyl or cycloalkynyl group or polymer unit, each substituted or unsubstituted, or further functionalized polyhedral oligomeric silicon-oxygen cluster units, attached via a polymer unit or a bridging unit, X=oxy, hydroxy, alkoxy, carboxy, silyl, alkylsilyl, alkoxysilyl, siloxy, alkylsiloxy, alkoxysiloxy, silylalkyl, alkoxysilylalkyl, alkylsilylalkyl, halogen, epoxy, ester, fluoroalkyl, isocyanate, blocked isocyanate, acrylate, methacrylate, nitrile, amino, phosphine or polyether group or substituents of type R containing at least one such group of type X.

The polyhedral oligomeric silicon-oxygen cluster unit of the masterbatch of the invention is preferably functionalized; in particular, the polyhedral oligomeric silicon-oxygen cluster unit represents a spherosilicate unit in accordance with the formula

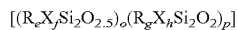

where
e, f, g=0-3; h=1-4; o+p≧4; e+f=3 and g+h=4, but preferably a functionalized oligomeric spherosilicate unit, but more preferably a silasesquioxane unit in accordance with the formula

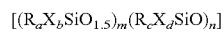

where
a, b, c=0-1; d=1-2; m+n≧4; a+b=1; c+d=2, but very preferably a functionalized oligomeric silasesquioxane unit Very particular preference is given to nucleating agents based on an oligomeric silasesquioxane unit in accordance with structure 4, 5 or 6;

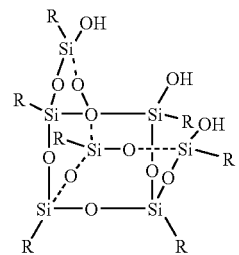

4

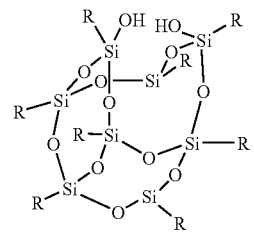

5

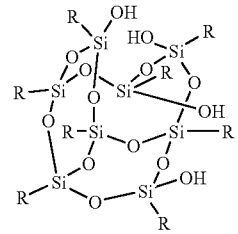

6 where R=hydrogen atom, alkyl, cycloalkyl, alkenyl, cycloalkenyl, alkynyl or cycloalkynyl group or polymer unit, each substituted or unsubstituted, or further functionalized oligomeric silasesquioxane units attached via a polymer unit or a bridging unit The masterbatch of the invention comprising functionalized oligomeric silasesquioxane units can be obtained by reacting silasesquioxanes having free hydroxy groups with monomeric functionalized silanes of the structure $Y_3Si$—$X^1$, $Y_2SiX^1X^2$ and $YSiX^1X^2X^3$, where the substituent Y is a leaving group selected from alkoxy, carboxy, halogen, silyloxy or amino group, the substituents $X^1$, $X^2$ and $X^3$ are of type X and are identical or different, where X=oxy, hydroxy, alkoxy, carboxy, silyl, alkylsilyl, alkoxysilyl, siloxy, alkylsiloxy, alkoxysiloxy, silylalkyl, alkoxysilylalkyl, alkylsilylalkyl, halogen, epoxy, ester, fluoroalkyl, isocyanate, blocked isocyanate, acrylate, methacrylate, nitrile, amino, phosphine or polyether group or substituents of type R containing at least one such group of type X, and R=hydrogen atom, alkyl, cycloalkyl, alkenyl, cycloalkenyl, alkynyl or cycloalkynyl group or polymer unit, each substituted or unsubstituted, or further functionalized oligomeric silasesquioxane units attached via a polymer unit or a bridging unit.

The substituents of type R in the silasesquioxane can all be identical, producing a so-called functionalized homoleptic structure in accordance with

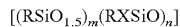

where m+n=z and z≧4, z corresponding to the number of silicon atoms in the framework of the polyhedral oligomeric silicon-oxygen cluster unit, and R=hydrogen atom, alkyl, cycloalkyl, alkenyl, cycloalkenyl, alynyl or cycloalkynyl group or polymer unit, each substituted or unsubstituted, or further functionalized polyhedral oligomeric silicon-oxygen cluster units attached via a polymer unit or a bridging unit, X=oxy, hydroxy, alkoxy, carboxy, silyl, alkylsilyl alkoxysilyl, siloxy, alkylsiloxy, alkoxysiloxy, silylalkyl, alkoxysilylalkyl, alkylsilylalkyl, halogen, epoxy, ester, fluoroalkyl, isocyanate, blocked isocyanate, acrylate, methacrylate, nitrile, amino, phosphine or polyether group or substituents of type R comprising at least one such group of type X, the substituents of type R being identical or different and the substituents of type X being identical or different.

In one further embodiment of the masterbatch of the invention it is possible for at least two of the substituents of type R in the polyhedral oligomeric silasesquioxane unit to be different, in which case reference is made to a functionalized heteroleptic structure in accordance with

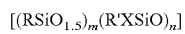

where m+n=z and z≧4, z corresponding to the number of silicon atoms in the framework of the polyhedral oligomeric silicon-oxygen cluster unit, and R=hydrogen atom, allyl, cycloalkyl, alkenyl, cycloalkenyl, atkinyl or cycloalkynyl group or polymer unit, each substituted or unsubstituted, or further functionalized polyhedral oligomeric silicon-oxygen cluster units attached via a polymer unit or a bridging unit, X=oxy, hydroxy, alkoxy, carboxy, silyl, alkylsilyl, alkoxysilyl, siloxy, alkylsiloxy, alkoxysiloxy, silylalkyl, alkoxysilylalkyl, allylsilylalkyl, halogen, epoxy, ester, fluoroalkyl, isocyanate, blocked isocyanate, acrylate, methacrylate, nitrile, amino, phosphine or polyether group or substituents of type R comprising at least one such group of type X, the substituents of type R being identical or different and the substituents of type X being identical or different.

It can be especially advantageous if the polyhedral oligomeric silicon-oxygen cluster unit of the masterbatch of the invention contains not more than one substituent of type X. In particular it is possible in this way to prevent instances of crosslinking occuring between the polyhedral oligomeric silicon-oxygen clusters individually or between the polyhedral oligomeric silicon-oxygen clusters and the thermoplastic carrier materials.

With very particular preference the masterbatch of the invention comprises functionalized oligomeric silasesquioxanes of the formula 7

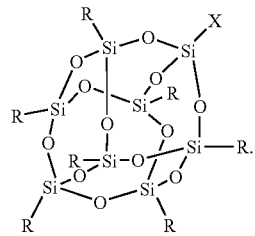

The polyhedral oligomeric silicon-oxygen clusters of the masterbatch of the invention can contain a reactive group which is reacted with the carrier material. By this means it is possible to bind the polyhedral oligomeric silicon-oxygen clusters in extremely fine dispersion, i.e. in molecular structure, coordinatively or covalently to the thermoplastic carrier material.

In one particular embodiment of the masterbatches of the invention the polyhedral oligomeric silicon-oxygen clusters form at least one bond, preferably a coordinative bond, to the polymer of the thermoplastic carrier material. For this purpose the substituents of type X in the polyhedral oligomeric silicon-oxygen cluster unit and the reactive functional groups of the polymers of the thermoplastic carrier material must be harmonized with one another. Both the polymer of the thermoplastic carrier material and the polyhedral oligomeric silicon-oxygen clusters of the masterbatch of the invention can contain double bonds, hydroxy, carboxy, amino, isocyanate, epoxy, alkoxysilyl, siloxy, alxylsiloxy, alkoxysiloxy or alkoxysilylallyl groups. By mechanical stress, such as extrusion, for example, by increased temperature, radiation, addition of moisture or addition of initiator, it is possible for a bond to be formed between the polymer of the thermoplastic carrier material and the polyhedral oligomeric silicon-oxygen clusters, so that it is possible at least for a coordinative bond to form and hence for dispersion in the masterbatch of the invention to be extremely fine. Initiating radiation used can be electron beams, UV radiation or microwave radiation.

An alternative option is to proceed conversely. This means that the polymer of the thermoplastic carrier material contains isocyanate, blocked isocyanate, epoxy, alkoxysilyl, siloxy, alkylsiloxy, alkoxysiloxy or alkoxysilylalkyl groups or vinylic double bonds while the polyhedral oligomeric silicon-oxygen clusters of the masterbatch of the invention contain at least one hydroxy, carboxy, primary or secondary amino group or a double bond. In this case as well it is possible for dispersion in the masterbatch of the invention to be extremely fine.

If the polyhedral oligomeric silicon-oxygen cluster units are not incorporated, as described above, by way of a covalent bond of the polyhedral oligomeric silicon-oxygen clusters to the polymers of the thermoplastic carrier material, then they can also be so incorporated by way of a coordinative attachment. In this case as well it is possible to achieve extremely fine dispersion of the polyhedral oligomeric silicon-oxygen clusters in the masterbatch of the invention.

The masterbatch of the invention can be prepared by reacting the polyhedral oligomeric silicon-oxygen clusters with the melted thermoplastic carrier material. In this case the polyhedral oligomeric silicon-oxygen clusters are added by mechanical stress without solvent to a polymer melt and are reacted with the polymer matrix. Particularly suitable apparatuses include extruders and kneading equipment such as, for example, Banbury kneaders and mixers.

This invention additionally provides a process for preparing a transparent thermoplastic, which comprises mixing one part by weight of the masterbatch of the invention into from 3 to 11 parts by weight of a further thermoplastic, polymer by mechanical stress without solvent at a temperature of at least 50° C.

The addition of the masterbatch of the invention to a thermoplastic polymer in melt form can take place either directly after the polymerization; preferably, the masterbatch of the invention can be added in combination with further additives, such as, for example, heat stabilizers and light stabilizers, optical brighteners, antistats, lubricants, antiblocking agents, fillers, dyes or pigments—depending on the subsequent use of the plastic. In one particular embodiment the masterbatch of the invention can also be added to ready-formulated pellets of the polymer.

Likewise provided by this invention is a transparent thermoplastic prepared by the process of the invention, wherein the concentration of the polyhedral oligomeric silicon-oxygen clusters is not more than 5% by weight.

Through the addition of the masterbatch of the invention to a thermoplastic polymer, the resultant plastic of the invention can have a glass transition temperature increased by at last 5%.

The thermoplastic polymer is composed preferably of one or more polymers selected from polyester, copolyester, polycarbonate, polyamide, copolyamide, polyether-block-anide, cyclic olefin copolymer (COC), polymethyl methacrylate, polyphenylene ether, polyurethane, polysiloxane, polysilane, polytetaluoroethylene, polyoxymethylene, polyvinyl chloride, vinyl chloride copolymer, polystyrene, copolymers of styrene, acrylonitrile-butadiene-styrene copolymers (ABS polymers), styrene-acrylonitrile copolymers or rubber. More preferably the thermoplastic polymer is composed of one or more polymers selected from polyester, copolyester, polymethyl methacrylate, polycarbonate, polyamides, copolyamides or polyether-block-amides.

The plastic of the invention preferably has the same transparency in respect of electromagnetic radiation having a wavelength of from 400 nm to 800 nm as a corresponding plastic absent the masterbatch of the invention.

The transparent thermoplastic of the invention may also feature an increased scratch resistance as compared with the plain thermoplastic. In order to determine the scratch resistance a specimen measuring 2×8×50 mm is fastened on a horizontal surface and, under a pressure of 100 g is subjected to steel wool of the type Abrazo from Aldi Süd at a temperature of 25° C., 15 times in one direction for 30 seconds in each case. Subsequently the treated surface is inspected from a distance of 40 cm for scratches visible to the human eye.

The transparent thermoplastic of the invention preferably has an improved tactility which can be ascertained subjectively. This means that the surface of the plastic of the invention feels more velvety, softer, in other words, more "velour like". In contrast, where the tactility is poor, the surface feels smooth and cold, in other words "plasticky".

The examples which follow are intended to illustrate the invention without being intended to restrict the invention to this embodiment.

1. Preparation of Polyhedral Oligomeric Silicon-Oxygen Clusters of the Masterbatch of the Invention

EXAMPLE 1.1

Synthesis of $(isobutyl)_8Si_8O_{12}$

A solution of 6.4 g (0.11 mol) of KOH in 200 ml of water is added to a solution of 446 g (2.5 mol) of isobutyltrimethoxysilane (isobutyl)Si(OMe)$_3$ (DYNASYLAN®IBTMO, Degussa AG) in 4300 ml of acetone with stirring. The reaction mixture is subsequently stirred at 30° C. for 3 days. The resultant precipitate is filtered off and dried in vacuo at 70° C. The $(isobutyl)_8Si_8O_{12}$ product is obtained in a yield of 262 g.

EXAMPLE 1.2

Synthesis of $(isobutyl)_7Si_7O_9(OH)_3$

At a temperature of 55° C. 55 g (63 mmol) of $(isobutyl)_8Si_8O_{12}$ are introduced in 500 ml of an acetone/methanol mixture (volume ratio 84:16) containing 5.0 ml (278 mmol) of H$_2$O and 10.0 g (437 mmol) of LiOH. The reaction mixture is then stirred at 55° C. for 18 h and subsequently added to 500 ml of 1 N hydrochloric acid. After 5 minutes of stirring the solid obtained is filtered off and washed with 100 ml of methanol. Drying in air gives 54.8 g of $(isobutyl)_7Si_7O_9(OH)_3$.

EXAMPLE 1.3

Synthesis of $(3\text{-aminopropyl})(isobutyl)_7Si_8O_{12}$ 4.67 g (26 mmol) of 3-aminopropyltriethoxysilane (DYNASYLAN®AMEO, Degussa AG) are added at 20° C. to a solution of 20 g (25.3 mmol) of $(isobutyl)_7Si_7O_9(OH)_3$ (from example 1.2) in 20 ml of tetrahydrofuran. The mixture is subsequently stirred overnight. Then the reaction solution is admixed with 100 ml of methanol over the course of 3 minutes. Isolation by filtration, washing with methanol, and subsequent drying gives 17 g of $(3\text{-aminopropyl})(isobutyl)_7Si_8O_{12}$ (77% yield) as a white powder.

EXAMPLE 1.4

Synthesis of $(3\text{-glycidoxypropyl})(isobutyl)_7Si_8O_{12}$ 15.2 g (64.3 mmol) of (3-glycidoxypropyl)trimethoxysilane (DYNASYLAN®GLYMO, Degussa AG) are added at 20° C. to a solution of 50 g (63 mmol) of $(isobutyl)_7Si_7O_9(OH)_3$ (prepared as per example 1.2) in 50 ml of tetrahydrofuran. Following the addition of 2.5 ml of tetraethylammonium hydroxide solution (35% by weight tetraethylammonium hydroxide in water, 6 mmol base, 90 mmol water) the mixture is stirred overnight Removal of about 15 ml of tetrahydrofuran results in a white suspension. Further precipitation of the product is brought about by slow addition of 250 ml of methanol over the course of 30 minutes. After filtration, the solid which remains is washed with methanol. Drying gives 46 g of $(3\text{-glycidoxypropyl})(isobutyl)_7Si_8O_{12}$ (78% yield) as a white powder.

2. Preparation of an Inventive Masterbatch

Both Polyamide 12 (VESTAMID®) and polybutylene terephthalate (VESTODUR®), serving as thermoplastic carrier material, are first premixed with one of the polyhedral oligomeric silicon-oxygen clusters prepared in accordance with examples 1.3 and 1.4, in a standard commercial mixing drum, and this mixture is then mixed in both cases at 235° C. on a corotating twin-screw extruder (miniextruder) from Haake (Rheomex PTW 16/15) in an amount of 100 g in each case. The amount of the polyhedral silicon-oxygen cluster added is in this case between 10% and 40% by weight.

TABLE 1

Compilation of the test parameters for example 2

| Example | Polymer | Polyhedral oligomeric silicon-oxygen clusters Amount (in % by weight) | from example | Inventive |
|---|---|---|---|---|
| 2.1 | Polybutylene | 15 | 1.3 | X |
| 2.2 | terephthalate | 25 | 1.3 | X |
| 2.3 | (VESTODUR ® 1000) | — | | |
| 2.4 | Polyamide 12 | 18 | 1.4 | X |
| 2.5 | (VESTAMID ® L 1700) | 30 | 1.4 | X |
| 2.6 | | — | | |

3. Production of the Inventive Plastic

After the extrudates have been chopped the masterbatch prepared in example 2 is passed again, together with Polyamide 12 or polybutylene terephthalate, through the aforementioned extruder at 235° C. 100 g of crude pellets are processed in each case. The masterbatch is metered in via a shaker trough in the amounts indicated in the table below. Then test specimens with a thickness of 2 mm, a width of 8 mm and a length of 50 mm are molded from Polyamide 12 (VESTAMID®) or from polybutylene terephthalate (VESTODUR®) in an automatic injection molding machine from Dr. Boy (Boy 22A).

TABLE 2

Compilation of the test parameters from example 3

| Example | Plastic | Masterbatch (from example) | Amount (in % by weight) | Amount of polyhedral oligomeric silicon-oxygen clusters in the plastic (in % by weight) |
|---|---|---|---|---|
| 3.1 | Polybutylene terephthalate (VESTODUR ® 1000) | 2.1 | 3.3 | 0.5 |
| 3.2 | Polybutylene terephthalate (VESTODUR ® 1000) | 2.2 | 4.0 | 1.0 |
| 3.3 | Polybutylene terephthalate (VESTODUR ® 1000) | — | — | 0 |
| 3.4 | Polyamide 12 (VESTAMID ® L 1700) | 2.5 | 1.6 | 0.5 |
| 3.5 | Polyamide 12 (VESTAMID ® L 1700) | 2.4 | 11.1 | 2 |
| 3.6 | Polyamide 12 (VESTAMID ® L 1700) | — | — | 0 |

4. Characterization of an Inventive Plastic

EXAMPLE 4.1

Light Transmittance or Transparency

Visual comparison of the inventive plastics from examples 2.1 and 2.2 with a plastic from example 2.3 showed that the three samples have the same light transmittance. Assessment in terms of light transmittance was made for this purpose using sheets of the inventive plastics with a thickness of 1 cm, the light having a wavelength of from 400 nm to 800 nm. The samples have the same transparency if no differences are perceptible to the human eye.

Visual comparison of the inventive plastics from examples 2.4 and 2.5 with a plastic from example 2.6 also showed that the three samples have the same light transmittance.

It is found that the light transmittance of the plastic is unaffected by the addition of the inventive masterbatch. The masterbatch thus possesses the same light transmittance as the carrier material.

EXAMPLE 4.2

Scratch Resistance

The test specimens produced in examples 3.1 to 3.6 are clamped to a horizontal surface and, using a standard commercial steel wool pad (Abrazo, from Aldi) which was screwed to a die with a weight of 100 g, are moved in one direction 15 times in each case for 30 seconds at a temperature of 25° C. Subsequently the treated surface of the test specimens is assessed from a distance of 40 cm for scratches visible to the human eye.

TABLE 3

| Test specimen (from example) | Scratch resistance | Inventive |
|---|---|---|
| 3.1 | 3 | X |
| 3.2 | 2 | X |
| 3.3 | 5 | |
| 3.4 | 3 | X |

TABLE 3-continued

| Test specimen (from example) | Scratch resistance | Inventive |
|---|---|---|
| 3.5 | 1 | X |
| 3.6 | 5 | |

(Assessments 1 to 5, where 1 denotes very good scratch resistance, i.e., no scratches are visible to the human eye from a distance of 40 cm, and 5 denotes very poor scratch resistance, i.e., the scratch resistance is the same as that of the corresponding plastic absent the inventive masterbatch.)

From table 3 it is evident that the inventive masterbatch significantly increases the scratch resistance of the test specimens examined.

EXAMPLE 4.3

Tactility

By tactility is meant the subjective sensation when the test specimen comes into contact with the hand. A rating of 1 is intended to express a pleasant sensation, i.e., "warm", "velour like", and a rating of 5 an unpleasant sensation, i.e., "smooth", "cold", "plasticty".

TABLE 4

| Test specimen (from example) | Tactility | Inventive |
|---|---|---|
| 3.1 | 2 | X |
| 3.2 | 1 | X |
| 3.3 | 5 | |
| 3.4 | 2 | X |
| 3.5 | 1 | X |
| 3.6 | 5 | |

The table shows that the tactility of the test specimen produced wit the inventive masterbatch is significantly enhanced.

What is claimed is:

1. A transparent masterbatch for improving the surface properties of thermoplastics, the transparent masterbatch comprising:
   from 40% to 90% by weight of at least one polymer selected from the group consisting of a polyester, a copolyester, copolyamide, a cyclic olefin copolymer (COC), a polymethyl methacrylate, a polyphenylene ether, a polyurethane, a polysiloxane, a polysilane, a polytetrafluoroethylene, a polyoxymethylene, a polyvinyl chloride, a vinyl chloride copolymer, a polystyrene, an acrylonitrile-butadiene-styrene copolymers (ABS polymers), and a styrene-acrylonitrile copolymers (SAN polymers),
   and from 10% to 60% by weight of polyhedral oligomeric silicon-oxygen cluster units in accordance with the formula

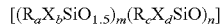
   $[(R_a X_b SiO_{1.5})_m (R_c X_d SiO)_n]$ wherein a, b, c=0-1; d=1-2; a+b=1; c+d=2; m+n≧4; and m, n ≠0;
   R=a hydrogen atom, an alkyl, a cycloalkyl, an alkenyl, a cycloalkenyl, an alkynyl, a cycloalkynyl group, or polymer unit, each substituted or unsubstituted, or further functionalized polyhedral oligomeric silicon-oxygen cluster units attached via a polymer unit or a bridging unit,
   X=an oxy, a hydroxy, an alkoxy, a carboxy, a silyl, an alkylsilyl, an alkoxysilyl, a siloxy, an alkylsiloxy, an alkoxysiloxy, a silylalkyl, an alkoxysilylalkyl, an alkylsilylalkyl, a halogen, an epoxy, an ester, a fluoroalkyl, an isocyanate, a blocked isocyanate, an acrylate, a methacrylate, a nitrile, an amino, a phosphine or a polyether group or substituents of type R containing at least one such group of type X,
   the substituents of type R being identical or different, and the substituents of type X being identical or different.

2. The masterbatch as claimed in claim 1, wherein the silicon-oxygen cluster unit comprises not more than 1 substituent of type X.

3. The masterbatch as claimed in claim 1, wherein the at least one polymer comprises further additives.

4. The masterbatch as claimed in claim 1, wherein the at least one polymer comprises at least one of:
   a polyester, a copolyester, a polymethyl methacrylate, and a copolyamide.

5. The masterbatch as claimed in claim 1, comprising from 20 to 50% by weight of polyhedral oligomeric silicon-oxygen cluster units, and from 50 to 80% by weight of the at least one polymer.

6. The masterbatch as claimed in claim 1, wherein the polyhedral oligomeric silicon-oxygen cluster unit has a molecular size of not more than 100 nm.

7. A process for preparing a transparent thermoplastic, which comprises mixing one part by weight of the masterbatch of claim 1 into from 3 to 11 parts by weight of a further thermoplastic polymer mechanically without solvent at a temperature of at least 50° C.

8. A transparent thermoplastic prepared by a process as claimed in claim 7, wherein the concentration of the polyhedral oligomeric silicon-oxygen cluster units is not more than 5% by weight.

9. The transparent thermoplastic as claimed in claim 8, wherein the scratch resistance is higher than that of the plain thermoplastic.

10. The transparent thermoplastic as claimed in claim 8, wherein the glass transition temperature is at least 5% higher than that of the plain thermoplastic.

11. The transparent thermoplastic as claimed in claim 8, having a soft and velvety tactility.

12. A transparent masterbatch for improving the surface properties of thermoplastics, the transparent masterbatch comprising:
   from 40% to 90% by weight of at least one polymer selected from the group consisting of a polyester, a copolyester, copolyamide, a cyclic olefin copolymer (COC), a polymethyl methacrylate, a polyphenylene ether, a polyurethane, a polysiloxane, a polysilane, a polytetrafluoroethylene, a polyoxymethylene, a polyvinyl chloride, a vinyl chloride copolymer, a polystyrene, an acrylonitrile-butadiene-styrene copolymers (ABS polymers), and a styrene-acrylonitrile copolymers (SAN polymers),
   and from 10% to 60% by weight of polyhedral oligomeric silicon-oxygen cluster units in accordance with the formula

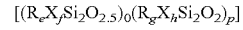
   $[(R_e X_f Si_2 O_{2.5})_o (R_g X_h Si_2 O_2)_p]$ wherein e, f, g =0-3; h =1 –4; e+f =3; g+h =4; o+p ≧4; and o, p ≠0;
   R =a hydrogen atom, an alkyl, a cycloalkyl, an alkenyl, a cycloalkenyl, an alkynyl, a cycloalkynyl group, or polymer unit, each substituted or unsubstituted, or further functionalized polyhedral oligomeric silicon-oxygen cluster units attached via a polymer unit or a bridging unit,
   X =an oxy, a hydroxy, an alkoxy, a carboxy, a silyl, an alkylsilyl, an alkoxysilyl, a siloxy, an alkylsiloxy, an alkoxysiloxy, a silylalkyl, an alkoxysilylalkyl, an alkylsilylalkyl, a halogen, an epoxy, an ester, a fluoroalkyl, a isocyanate, a blocked isocyanate, an acrylate, a methacrylate, a nitrile, an amino, a phosphine or a polyether group or substituents of type R containing at least one such group of type X, the substituents of type R being identical or different, and the substituents of type X being identical or different.

13. The masterbatch as claimed in claim 12, wherein the silicon-oxygen cluster unit comprises not more than 1 substituent of type X.

14. The masterbatch as claimed in claim 12, wherein the at least one polymer comprises at least one of:
a polyester, a copolyester, a polymethyl methacrylate, and a copolyamide.

15. The masterbatch as claimed in claim 12, comprising from 20 to 50% by weight of polyhedral oligomeric silicon-oxygen cluster units, and from 50 to 80% by weight of the at least one polymer.

16. The masterbatch as claimed in claim 12, wherein the polyhedral oligomeric silicon-oxygen cluster unit has a molecular size of not more than 100 nm.

* * * * *